United States Patent
Burke et al.

(10) Patent No.: US 9,905,888 B2
(45) Date of Patent: Feb. 27, 2018

(54) SELF-HEALING LIQUID/SOLID STATE BATTERY

(71) Applicants: Massachusetts Institute of Technology, Cambridge, MA (US); Total Marketing Services, Puteaux (FR)

(72) Inventors: Paul J. Burke, Framingham, MA (US); Brice H. V. Chung, Boston, MA (US); Satyajit R. Phadke, Arlington, MA (US); Xiaohui Ning, Shaanxi (CN); Donald R. Sadoway, Cambridge, MA (US)

(73) Assignees: Massachusetts Institute of Technology, Cambridge, MA (US); Total S.A., Courbevoie (FR); Total Energies Nouvelles Activites USA, Coubervoie (FR)

( * ) Notice: Subject to any disclaimer, the term of this patent is extended or adjusted under 35 U.S.C. 154(b) by 217 days.

(21) Appl. No.: 14/526,897

(22) Filed: Oct. 29, 2014

(65) Prior Publication Data
US 2016/0156068 A1    Jun. 2, 2016

Related U.S. Application Data

(60) Provisional application No. 61/896,777, filed on Oct. 29, 2013.

(51) Int. Cl.
*H01M 10/39* (2006.01)
*H02J 7/00* (2006.01)
(Continued)

(52) U.S. Cl.
CPC ......... *H01M 10/399* (2013.01); *H01M 4/134* (2013.01); *H01M 4/38* (2013.01);
(Continued)

(58) Field of Classification Search
USPC .......................................................... 429/223
See application file for complete search history.

(56) References Cited

U.S. PATENT DOCUMENTS

| | | |
|---|---|---|
| 3,238,437 A | 3/1966 | Foster et al. |
| 3,663,295 A | 5/1972 | Baker |
| (Continued) | | |

FOREIGN PATENT DOCUMENTS

| | | |
|---|---|---|
| GB | 2062939 A | 5/1981 |
| WO | 2015063588 A2 | 5/2015 |

OTHER PUBLICATIONS

Kim et al., "Calcuim-bismuth electrodes for large-scale energy storage (liquid metal batteries)," Journal of Power Sources, vol. 241, pp. 239-248, Apr. 19, 2013.
(Continued)

*Primary Examiner* — Osei Amponsah
(74) *Attorney, Agent, or Firm* — Sunstein Kann Murphy & Timbers LLP

(57) ABSTRACT

A battery system that exchanges energy with an external device is provided. The battery system includes a positive electrode having a first metal or alloy, a negative electrode having a second metal or alloy, and an electrolyte including a salt of the second metal or alloy. The positive electrode, the negative electrode, and the electrolyte are in a liquid phase at an operating temperature during at least one portion of operation. The positive electrode is entirely in a liquid phase in one charged state and includes a solid phase in another charged state. The solid phase of the positive electrode includes a solid intermetallic formed by the first and the second metals or alloys. Methods of storing electrical energy from an external circuit using such a battery system are also provided.

20 Claims, 14 Drawing Sheets

(51) Int. Cl.
*H01M 4/38* (2006.01)
*H01M 10/44* (2006.01)
*H01M 4/40* (2006.01)
*H01M 4/134* (2010.01)
*H01M 10/052* (2010.01)
*H01M 4/02* (2006.01)

(52) U.S. Cl.
CPC ........... *H01M 4/405* (2013.01); *H01M 10/39* (2013.01); *H01M 10/44* (2013.01); *H02J 7/0052* (2013.01); *H01M 10/052* (2013.01); *H01M 2004/021* (2013.01)

(56) References Cited

U.S. PATENT DOCUMENTS

| | | |
|---|---|---|
| 3,775,181 A | 11/1973 | Ryerson |
| 8,268,471 B2 | 9/2012 | Sadoway et al. |
| 8,323,816 B2 | 12/2012 | Bradwell et al. |
| 9,000,713 B2 | 4/2015 | Boysen et al. |
| 9,312,522 B2 | 4/2016 | Bradwell et al. |
| 2011/0014505 A1 | 1/2011 | Bradwell et al. |
| 2012/0104990 A1* | 5/2012 | Boysen ................ H01M 4/364 320/101 |
| 2013/0059176 A1 | 3/2013 | Stefani et al. |
| 2014/0099522 A1 | 4/2014 | Spatocco et al. |
| 2014/0113181 A1* | 4/2014 | Bradwell ................ H01M 2/10 429/163 |
| 2014/0272481 A1 | 9/2014 | Chung et al. |
| 2015/0004455 A1 | 1/2015 | Bradwell et al. |
| 2015/0132628 A1 | 5/2015 | Bradwell et al. |
| 2015/0249273 A1 | 9/2015 | Bradwell et al. |
| 2015/0249274 A1 | 9/2015 | Bradwell et al. |

OTHER PUBLICATIONS

Ning et al., "Self-healing Li—Bi liquid metal battery for grid-scale energy storage," Journal of Power Sources, vol. 275, pp. 370-376, Oct. 29, 2014.
Weaver et al., "The Sodium•Tin Liquid-Metal Cell," Journal of the Electrochemical Society, vol. 109, No. 8, pp. 653-657, Aug. 8, 1962
International Searching Authority, International Application No. PCT/IB2014/002608, dated Jun. 11, 2015, together with the Written Opinion of the International Searching Authority, 13 pages.

* cited by examiner

SELF-HEALING LIQUID/SOLID STATE BATTERY

CROSS-REFERENCE TO RELATED APPLICATIONS

This patent application claims the benefit of U.S. Provisional Patent Application No. 61/896,777 filed Oct. 29, 2013, the disclosure of which is incorporated by reference herein in its entirety.

STATEMENT REGARDING FEDERALLY SPONSORED RESEARCH OR DEVELOPMENT

This invention was made with Government support under Grant No. DE-AR0000047 awarded by the Department of Energy. The Government has certain rights in the invention.

TECHNICAL FIELD

The present invention relates to high capacity electrical energy storage. In particular, novel electrochemical energy storage devices and batteries are provided that operate in both the liquid phase and the solid phase.

BACKGROUND

Balancing supply and demand of electrical energy over time and location is a longstanding problem in an array of applications from commercial generator to consumer. The supply-demand mismatch causes systemic strain that reduces the dependability of the supply, inconveniencing consumers and causing loss of revenue. Since most electrical energy generation in the United States relies on the combustion of fossil fuels, suboptimal management of electrical energy also contributes to excessive emissions of pollutants and greenhouse gases. Renewable energy sources like wind and solar power may also be out of sync with demand since they are active only intermittently. This mismatch limits the scale of their deployment. Large-scale energy storage may be used to support commercial electrical energy management by mitigating supply-demand mismatch for both conventional and renewable power sources.

Electrochemistry-based technologies offer viable solutions for the storage of energy in an uninterruptible power supply environment. Many types of electrochemical cells have been used for large-scale energy storage. These cells provide efficient storage capabilities because of the rapid ionic migration and fast, reversible kinetics at both metal electrodes. Energy is stored at the negative electrode which is constituted mainly of a metal, referred to herein as the active metal or anodic metal, having a high chemical potential. In a discharged state, the active metal resides in the positive electrode at a low chemical potential in the form of an alloy. An electrolyte disposed between two electrodes enables ionic transportation of the active metal during charging or discharging. For example, descriptions of such cells may be found in U.S. Pat. No. 8,323,816, US Patent Publication No. US-2011-0014505-A1 and US Patent Publication No. US-2012-0104990-A1, the entire contents of which are incorporated herein by reference.

It is known in the art that batteries with solid phase electrodes typically demonstrate limited cycle life because of volume changes during charge/discharge cycling that leads to mechanical degradation. In contrast, batteries using liquid phase electrodes can lead to prolonged lifetime by intrinsically overcoming mechanical degradations. However, liquid phase regions must often be constrained to a small composition range, which in turn, limits the electrode's utilization and increases cost.

SUMMARY OF THE EMBODIMENTS OF THE INVENTION

In embodiments of the invention, we describe a metal electrode battery that operates in both the liquid and the solid phases.

In an embodiment of the invention, a battery system configured to exchange energy with an external device is provided. The battery system includes a positive electrode including a first metal or alloy (combination of two or more metals), a negative electrode including a second metal or alloy, and an electrolyte composed of a mixture of salts including a salt of the second metal. The electrolyte contacts the positive and negative electrodes at respective electrode/electrolyte interfaces, and the positive electrode, the negative electrode, and the electrolyte are in a liquid phase at operating temperature during at least one portion of operation. The positive electrode is entirely in a liquid phase in one charged state and includes a solid phase in another charged state. The solid phase of the positive electrode includes a solid intermetallic formed by the first and the second metals or alloys.

In another embodiment of the invention, a method of storing electrical energy from an external circuit is provided. The method includes providing a battery system having a positive electrode including a first metal or alloy, a negative electrode including a second metal or alloy, and an electrolyte including a salt of the second metal. The electrolyte contacts the negative electrode and the positive electrode at respective electrode/electrolyte interfaces. The positive electrode, the negative electrode, and the electrolyte are in a liquid phase at an operating temperature of the battery system during at least one portion of operation. The positive electrode is entirely in a liquid phase in one charged state and includes a solid phase in another charged state, and the solid phase of the positive electrode includes a solid intermetallic formed by the first and the second metals. The method further includes electronically connecting the battery system to the external circuit and operating the external circuit so as to drive transfer of the second metal from the positive electrode to the negative electrode.

In related embodiments, the first metal may include bismuth. The second metal may include an alkali metal, such as lithium. When the first metal includes bismuth and the second metal includes lithium, the solid intermetallic may be $Li_3Bi$. The operating temperature may be between about 300° C. to about 800° C., preferably the operating temperature is about 350° C. to about 600° C. The open circuit voltage may be at least about 0.5V. The negative electrode may be entirely in a liquid phase in one charged state and may include a solid phase in another charged state, and the solid phase of the negative electrode includes a solid intermetallic formed by the first and the second metals. The solid phase may increase cell capacity by about at least 10%.

BRIEF DESCRIPTION OF THE DRAWINGS

The foregoing features of embodiments will be more readily understood by reference to the following detailed description, taken with reference to the accompanying drawings, in which:

FIG. 2A shows when the cell is discharged, FIG. 2B shows when the cell is in operation and connected to a source of energy (charging circuit), and FIG. 2C shows when the cell is fully charged.

FIG. 3A shows when the cell is fully charged, FIG. 3B shows when the cell is in operation and connected to a load, and FIG. 3C shows when the cell is discharged.

The figures are not, in general, drawn to scale, and generally are schematic in nature.

DETAILED DESCRIPTION OF SPECIFIC EMBODIMENTS

As used in this description and the accompanying claims, the term "battery" may encompass individual electrochemical cells or cell units having a positive electrode, a negative electrode, and an electrolyte, as well as configurations having an array of electrochemical cells.

Figure 1A:
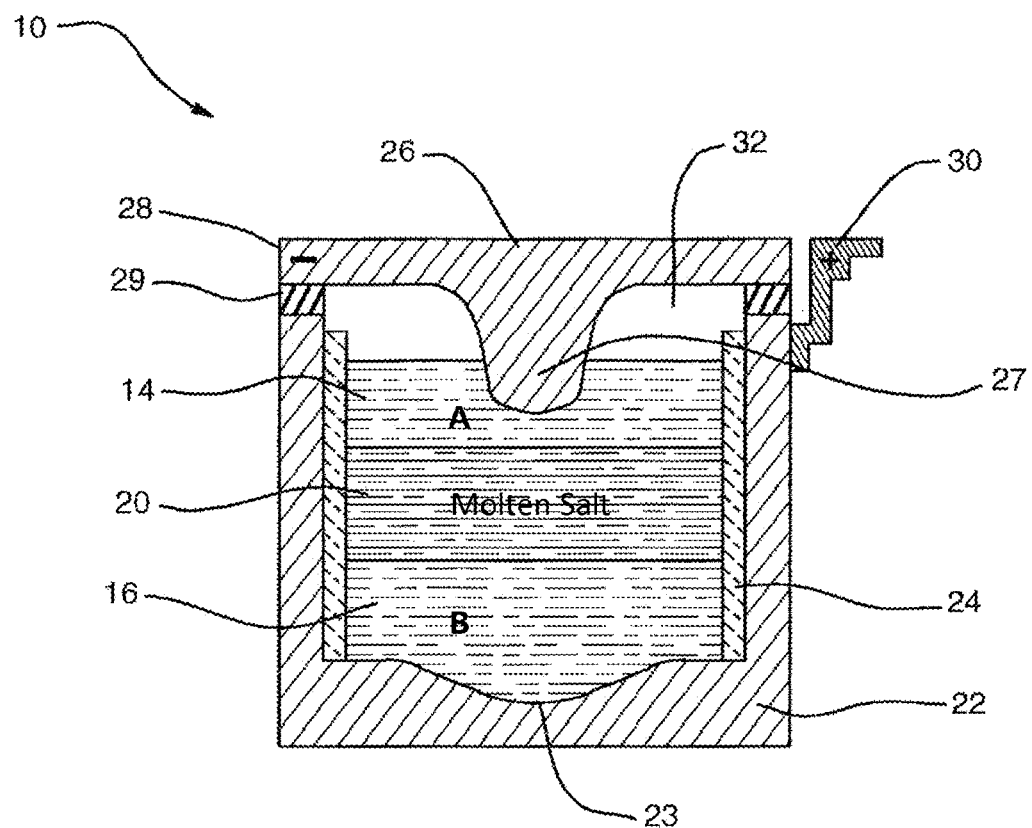
FIG. 1A is a vertical cross-sectional view showing a self-assembling metal-ion energy storage electrochemical cell according to embodiments of the present invention.

Referring to FIG. 1A, an electrochemical cell or battery 10, according to embodiments of the present invention, has a negative electrode 14 having a metal or alloy A, such as an alkali metal or alkaline earth metal, and a positive electrode 16 with a metallic or metalloid element or alloy B, such as a combination of one or more elements of Groups 12 to 16 of the periodic table of the elements (e.g., Zn, Al, Sn, Pb, Sb, Bi, Te, etc.). These electrodes cooperate to efficiently store and deliver energy across an electrolyte 20. Although these electrodes and the electrolyte may be in a liquid phase during one portion of operation, embodiments of the present invention provide a positive electrode (cathode) which operates in both the liquid and the solid phases. By allowing the composition of the positive electrode in a metal electrode battery to operate in both the liquid and solid phase regions, cost can be dramatically reduced, and the long lifetime attributes of liquid electrodes can be retained. In addition, the occurrence of the liquid phase during cycling can remove or heal any mechanical degradation incurred during the solid phase stage of cycling. Methods of storing electrical energy from an external circuit using such battery systems are also provided. Details of various embodiments are discussed below.

As shown in FIG. 1A, the cell 10 may include the electronically conductive layers 14, 16 and ionic conductive layer 20 confined in a container 22 that may be electrically conductive and may include an insulating inner sheath 24. The sheath 24 prevents shorting by electric conduction between the negative electrode 14 and the positive electrode 16 through the container 22 when such container is made of conductive material. Alternatively, the container 22 may be covered by a lid 26 which may be electrically conductive. An electrically insulating seal 29 may electrically isolate the lid 26 from the container 22 to confine the molten constituents and vapors within the container 22. In this case, the portion of the lid 26 in contact with the negative electrode 14 functions as a negative current collector 27, through which electrons may pass to an external source or sink (not shown) by way of a negative terminal 28 that is in contact with the lid 26.

The portion of the container 22 in contact with the positive electrode 16 functions as a positive current collector 23, through which electrons may pass to the external source or load by way of a positive terminal 30 connected to the container 22. The negative terminal 28 and the positive terminal 30 are oriented to facilitate arranging individual cell units in series by connecting the negative terminal 28 of one cell unit to the positive terminal 30 of another cell unit 10 to form a battery. The terminals 28 may also be connected to one another, and the terminal 30 also may be connected to one another to arrange the cells in parallel.

Figure 1B:
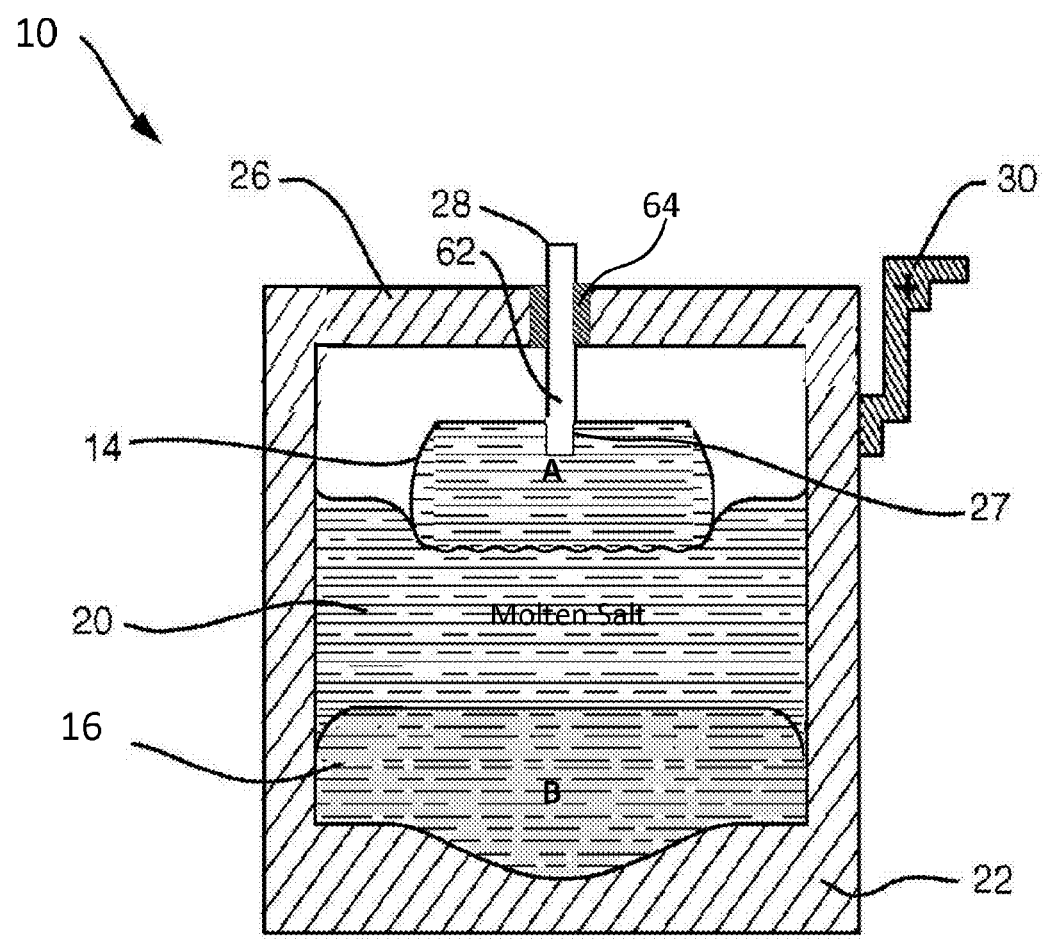
FIG. 1B is a vertical cross-sectional view showing another configuration of a metal-ion energy storage electrochemical cell without a sheath according to embodiments of the present invention.

Alternatively, the expense and complexity of electrically insulating the interior surface of the container 22 may be eliminated by using an electronically conductive structure 62 which holds the negative electrode 14 away from the container 22 walls, obviating the need for the insulating sheath 24, such as shown in FIG. 1B. One portion of the structure 62 which holds the liquid metal of the negative electrode 14 serves as the negative current collector 27 and another portion which extends outside the lid 16 serves as the negative terminal 28. An electrically insulating seal 64, e.g., made of boron nitride, alumina, magnesia, may separate the conductive structure 62 from the lid 16. The structure 62 is preferably configured so that some of the molten electrode 14 remains between the negative current collector 27 and the electrolyte 20 when the cell is fully discharged. Surface tension maintains the negative electrode 14 in place around the portion of the structure 62 that holds the electrode 14. The portion of the structure 62 that holds the electrode 14 may be in the shape of one or more rods, an inverted cup, or a mesh, e.g., folded into stacked layers or coiled into a spiral or tube. The mesh may be composed of strands on the order of 0.1 to 1 mm in diameter, with similar spacing. Alternatively, or in addition, the portion that holds the electrode 14 may be a permeable material, e.g., foam or sponge. Depending on the composition of the electrode 14, the structure 62 may be made of, e.g., carbon, mild steel, or a steel alloy containing, for example, nickel and/or chromium. Additional surface-tension approaches to holding liquid metals around a solid conductive structure are known to those skilled in the art.

Referring to FIGS. 1A and 1B, the cell 10 also may have an inert gas layer 32 overlaying the negative electrode 14 to accommodate global volume changes in the three-phase system produced by charging and discharging, or temperature changes. Optionally, the lid 26 or seal 29 incorporates a safety pressure valve (not shown). The container 22 and the lid 26 may be formed from materials having the requisite electric conductivity (when so required), mechanical strength, and resistance to chemical attack by the liquid electrodes 14 and 16 and electrolyte 20. Depending on the composition of the electrodes, conventional materials such as mild steel may be a suitable material for the container 22 and the lid 26. The sheath 24 may be formed from an electrically insulating material and should be corrosion-resistant against the electrodes 14 and 16 and the electrolyte 20. For example, boron nitride, aluminum nitride, alumina, and/or magnesia are appropriate materials for the sheath 24 and seal 29, although other materials, such as high temperature resistant polymers, like poly(oxyethylene) methacrylate-g-poly(dimethyl siloxane) (POEM-g-PDMS), also may be used. Alternatively, the entire container may be made of polymer, except for the current collectors 27, 23 that connect each electrode 14 and 16 to a corresponding negative terminal 28 and positive terminal 30.

In illustrative embodiments, the electrodes 14 and 16 and electrolyte 20 are constituted to establish chemical and physical properties compatible with simplicity and economy of construction, robustness, and rapid and efficient receipt and delivery of electrical energy. The illustrative metal ion cell 10 receives or delivers energy by transporting the metal of the negative electrode 14, referred to herein as the active metal, between the two electrically conductive electrodes 14 and 16 via an electrochemical pathway. The liquid electrolyte 20, comprising a cation of the active metal, enables ionic transport of the active metal during charging or discharging. Embodiments of the present invention may include any combination of metals or metal alloys which exhibit a suitable voltage. For example, the chemical composition of the negative electrode 14 may include a metal, such as an alkali or alkali earth metal, e.g., Li, Na, K, Mg, Ca, Ba, or combinations thereof, and the positive electrode 16 may include one or more elements of Groups 12 to 16 of the periodic table of the elements, such as Al, Si, Zn, Ga, Ge, Cd, In, Sn, Sb, Hg, Tl, Pb, Bi, Te, or combinations thereof. For example, the negative electrode may be lithium and the positive electrode may be bismuth or lead. The electrolyte may include a hydroxide salt of metal A, and/or one, two or more other salts, such as a halide, sulfate, carbonate or amide of metal A. For example, for a Li—Bi cell, the electrolyte may include LiCl—LiF (e.g., eutectic mixture of LiCl (70 mol %)—LiF (30 mol %)). In all systems, cost savings may be realized by extending the operating composition into the solid phase regions.

The electrodes 14 and 16 and the electrolyte 20 may be further formulated so that their densities are ordered in accordance with their functions in the cell 10. Various embodiments having respective densities increasing or decreasing in the order negative electrode 14/electrolyte 20/positive electrode 16, so that the cell 10 spontaneously self-assembles into a vertically stacked, layered structure, such as shown in FIG. 1A or 1B, upon melting the constituents, providing for simpler manufacture.

Figure 2A:
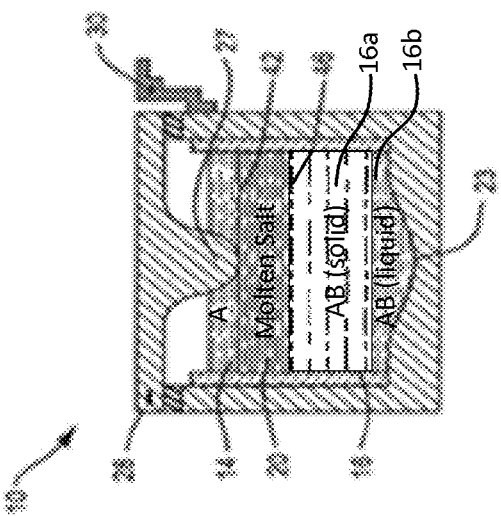
FIGS. 2A-2C are vertical cross-sectional views illustrating the charging process of a metal-ion energy storage electrochemical cell according to embodiments of the present invention.
Figure 2B:
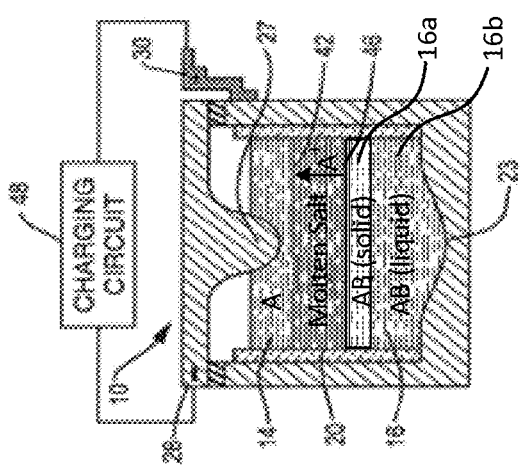
Figure 2C:
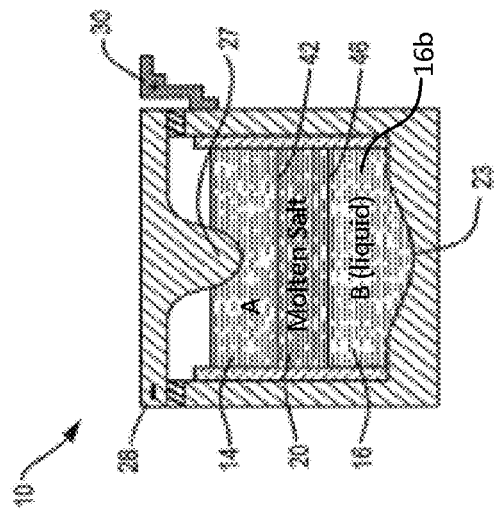

FIGS. 2A-2C illustrate the function of the cell 10 during charging according to embodiments of the present invention. FIG. 2A shows the cell 10 in an uncharged or discharged state. Before charging, the positive electrode 16 includes the active metal A along with the metallic or metalloid element B. The positive electrode 16 may be fully solid (not shown), or may include a solid phase 16a with a liquid phase 16b, such as shown in FIG. 2A. The negative electrode 14 meets the electrolyte 20 at an active metal-electrolyte interface 42. In a corresponding manner, the positive electrode 16 meets the electrolyte 20 at a separate solid alloy-electrolyte interface 46. As shown and discussed below, these interfaces move during charging and discharging, while maintaining the general volume of the electrolyte, and the volumes of the positive and negative electrodes increase or decrease at the expense of one another. In other words, the positive electrode 16 has a volume that increases or decreases in correlation to a respective decrease or increase of the volume of the negative electrode 14.

FIG. 2B shows the effect of the charging process on the components of the cell 10. To initiate charging, the terminals 28 and 30 are connected to an external charging circuit 48, which drives the active A metal from the positive electrode 16, through the electrolyte 20 to neutral metal at a higher chemical potential in the negative electrode 14. During charging, electron current travels from the external circuit, through the negative current collector 27, into the negative electrode 14, and to the active metal-electrolyte interface 42. Active cations A+ move across the electrolyte 20 toward the active metal-electrolyte interface 42. The active cations and the electrons meet at the interface 42 and are consumed in the reduction half-cell reaction A++e−→A. The neutral active metal atoms A created in the half-cell reaction accrue to the negative electrode 14. As the active metal A accumulates in the negative electrode 14, the active metal-electrolyte interface 42 moves further away from the negative current collector 27. At the alloy-electrolyte interface 46, atoms of the active metal A in the positive electrode are oxidized in the half-cell reaction A→A++e−. As active cations A+ enter the electrolyte 20, electrons are freed to pass through the positive current collector 23 to the external charging circuit 48. Oxidation of the active metal atoms A shrinks the solid phase 16a of the positive electrode 16, and the alloy-electrolyte interface 46 moves toward the positive current collector 23.

FIG. 2C shows the cell 10 in its final charged state. Charging has changed the composition of at least the positive electrode 16 by loss of atoms of the active metal A. In fact, in some embodiments, the positive electrode 16 may be nominally free of the active metal A at this point in the charge-discharge cycle, and the positive electrode 16 may be fully in the liquid phase 16b, such as shown in FIG. 2C. In general, the thickness of the negative electrode 14 has grown at the expense of the positive electrode 16. Since the charging process is conservative with respect to the active cations, the thickness of the electrolyte 20 is in principle unchanged.

The active metal A deposited in the metal electrode 14 represents stored electrical energy which may persist substantially indefinitely, as long as no external electric path joins the two electrodes 14 and 16. The half-cell reactions in the cell 10 generate liquid-phase products that remain at the electrodes 14 and 16, and in contact with the electrolyte. While the electrodes 14, 16 and electrolyte 20 may remain in their liquid state at an operating temperature of the cell, the active metal and the active cation are available to mechanize charge and discharge via an electrochemical pathway. This reversibility renders the metal ion cell suitable to use in batteries for energy storage.

Figure 3C:
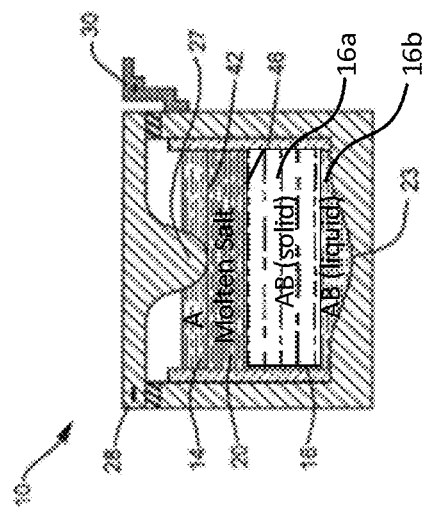
FIGS. 3A-3C are vertical cross-sectional views illustrating the discharging process of a metal-ion energy storage cell according to embodiments of the present invention.
Figure 3B:
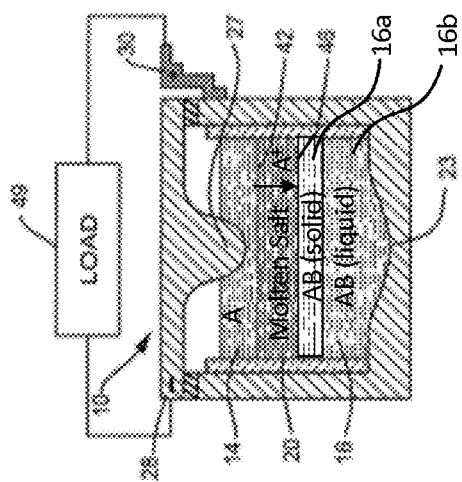
Figure 3A:
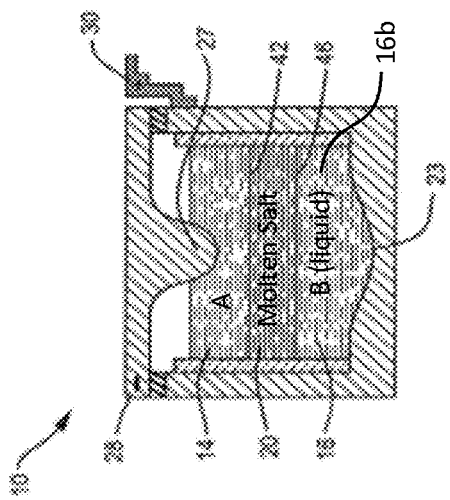

FIGS. 3A-3C illustrate discharging the cell 10 according to embodiments of the present invention. FIG. 3A shows the cell 10 in a charged state, while FIG. 3B shows the cell terminals 28 and 30 connected to an external load 49, which initiates discharge. During discharge, the active metal A moves spontaneously from the negative electrode 14, through the electrolyte 20 as active cations, and reverts to neutral metal at a lower chemical potential in the positive electrode 16, initially forming an alloy AB in the liquid phase 16b and then forming an alloy AB in the solid phase 16a. Electron current travels into the cell through the positive current collector 23 and the positive electrode 16, to the positive electrode-electrolyte interface 46. Active cations A+ migrate across the electrolyte 20 toward the positive electrode-electrolyte interface 46. Active cations A+ and electrons are consumed at the interface 46 in the reduction half-cell reaction A++e−→A. The neutral active metal atoms A produced accrue to the positive electrode 16. As the active metal A accumulates in the positive electrode 16, the alloy-electrolyte interface 46 moves further away from the positive current collector 23. At the active metal-electrolyte interface 42, atoms of the active metal A in the negative electrode 14 are oxidized in the half-cell reaction A→A++ e−. The active cations A+ produced enter the electrolyte 20, and the freed electrons pass through the negative current collector 27 to the external load 49. Oxidation of the active metal atoms causes attrition of the negative electrode 14, with movement of the active metal-electrolyte interface 42 toward the negative current collector 27.

FIG. 3C shows the cell 10 in its final discharged state. Discharging has changed the composition of at least the positive electrode 16, and the positive electrode 16 may include a substantial portion that is in the solid phase 16a (e.g., 10 vol. % or greater, preferably 50% or even 75% or greater). Preferably, a portion of the positive electrode 16 remains in the liquid phase 16b in order to facilitate electrical conduction between the positive electrode 16 and the positive current collector 23. The thickness of the positive electrode 16 may grow at the expense of the negative electrode 14, although the density of the solid phase 16a may vary the overall thickness of the positive electrode 16 depending on the specific chemistry used in the electrodes 14, 16. Since the discharging process is conservative with respect to the active metal cations, ideally the thickness of the electrolyte 20 is unchanged.

Figure 4:
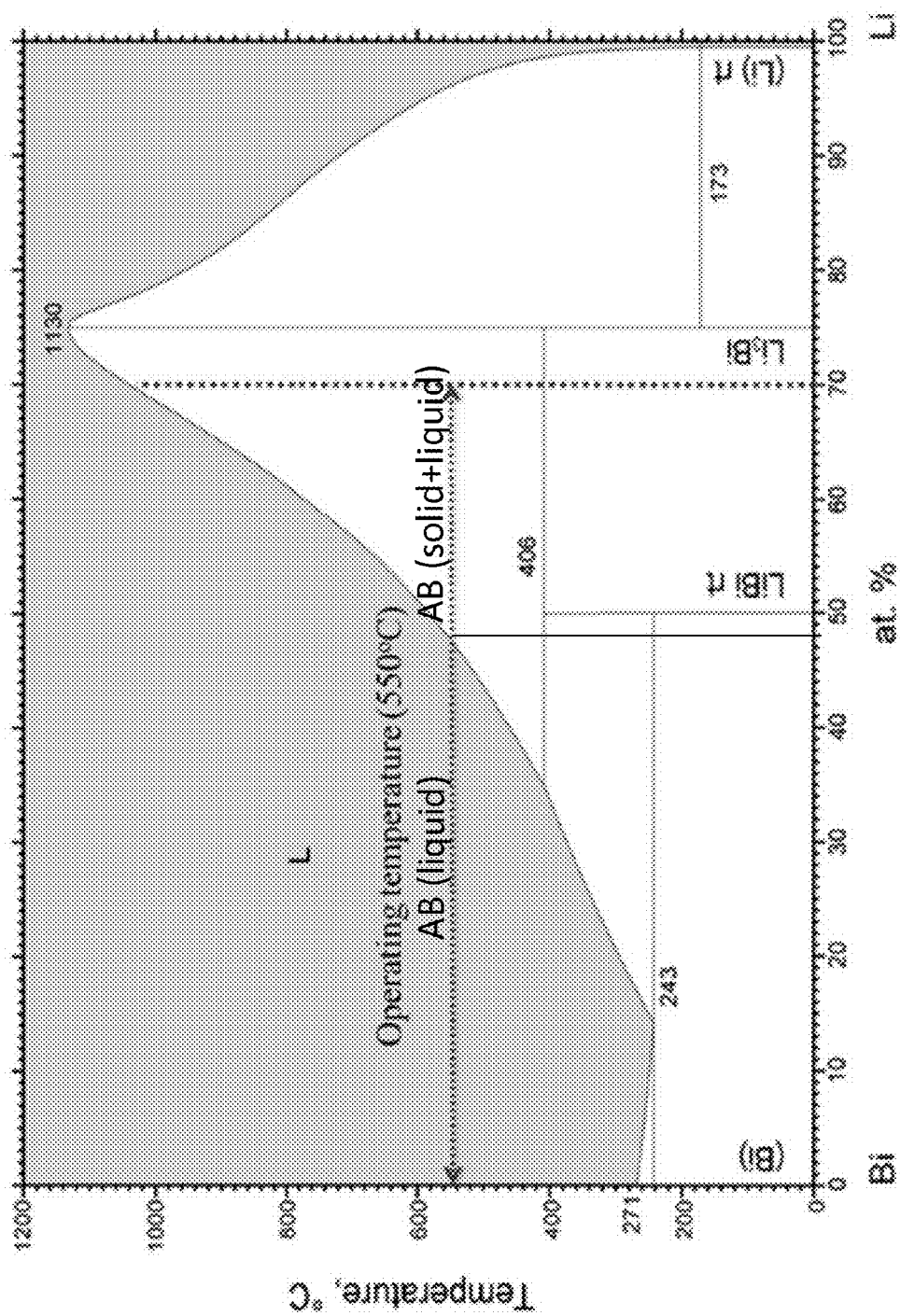
FIG. 4 shows a Li—Bi phase diagram for an exemplary Li—Bi battery system which operates in both the liquid and solid phases. At an operating temperature of 550° C., the horizontal dotted line AB (liquid) shows the concentrations of Li—Bi when the positive electrode is in the fully liquid phase and the horizontal dotted line AB (solid+liquid) shows the concentrations of Li—Bi when at least some portion of the positive electrode is in the solid phase in accordance with embodiments of the present invention.

In literature related to liquid metal electrode batteries, the fully discharged composition of the positive electrode has been restricted to the composition range in which the liquid approaches the first two phase region. In this manner, the electrodes remain fully liquid during operation. An example of a Li—Bi phase diagram for a metal Li—Bi battery system is shown in FIG. 4. In this battery system, lithium is the negative electrode and bismuth is the positive electrode. Normal operation of a conventional liquid metal Li—Bi battery system (e.g., at an arbitrary operating temperature of 550° C.) would follow horizontal line AB (liquid) during discharge from pure bismuth to 52% lithium (or even less) alloyed with bismuth, where the first solid $Li_3Bi$ intermetallic would begin to form. On subsequent charging, the positive electrode composition would go from 52% to 0% lithium in bismuth. In this manner of operation, the negative and positive electrodes would remain fully liquid at all states of charge and discharge.

However, in embodiments of the present invention, a solid intermetallic is allowed to form in the positive electrode. Using the same Li—Bi system as an example (e.g., at an arbitrary operating temperature of 550° C.), cell operation follows the horizontal dotted line AB (liquid) on FIG. 4 from pure bismuth to 52% lithium, but then the cell composition is configured to continue along the horizontal dotted line AB (solid+liquid) up to 70% lithium alloyed with bismuth (as shown in FIG. 4), and even up to 75% lithium alloyed with bismuth. In this new manner of operation, $Li_3Bi$ solid intermetallic begins to precipitate at 52% lithium (or even less) during discharge as the lithium composition increases from greater than 52% and passes into the two phase region. As the lithium composition continues to 75%, the amount of solid intermetallic may increase until the liquid phase is gone and the positive electrode is fully solid. While discharging between 52% and 75%, the solid intermetallic forms as a layer at the top of the positive electrode due to the proximity of the top interface to the anode and its low density compared to the remaining liquid phase, such as shown in FIGS. 3B and 3C. Upon charging, the $Li_3Bi$ solid layer reduces until the composition of lithium is less than about 52%, when again the positive electrode is fully liquid, such as shown in FIG. 2C. The operating temperature of the cell 10 is dependent upon the specific chemistry used for the electrodes 14, 16 and electrolyte 20, but is typically between about 300° C. to about 800° C., and preferably about 350° C. to about 600° C.

Table 1 illustrates the cost benefit of operating the Li—Bi battery to allow both the liquid and solid phase electrodes.

TABLE 1

Theoretical cost of a conventional liquid metal battery system and an exemplary Li—Bi battery system in accordance with the present invention

| | Li Cost $/Kg | Bi Cost $/Kg | Average Discharge Voltage | Energy Cost $/Kwh |
|---|---|---|---|---|
| 52% Li in Bi (Liquid phase) | 62 | 25 | 0.82 | 260 |
| 75% Li in Bi (Liquid + Solid phase) | 62 | 25 | 0.77 | 106 |

The above example assumes an infinitely small current is passing (thermodynamic equilibrium), such that the behavior exactly follows the phase diagram. However, in actual operation, when substantial current is passing, the composition at which the solids are formed may change. In general, the greater the current density, the lower the average concentration at which the first solid forms. Because of this dynamic property, it may be possible for solids to exist throughout the charge/discharge process, and only when the cell is sufficiently charged does it return to a fully liquid state. Ensuring that the cell is sufficiently charged may be of importance for long life operation because of the healing property of the liquid phase.

While the above discussion has focused on the positive electrode (cathode) operating in the liquid phase and solid phase at various stages during operation, the negative electrode (anode) 14 may also operate in the liquid phase and solid phase, in addition to the positive electrode 16.

EXAMPLES

Example 1

Li—Bi cells were constructed and successfully operated to prove the concept of a positive electrode that operates in both the liquid and solid phases. The amount of lithium used for these cells was 71.4 mol % which corresponds to a final positive electrode composition of $Li_{2.5}Bi$, although the capacity of the cells may be extended to 75 mol % lithium ($Li_3Bi$). The cells were assembled in the fully charged state.

Figure 5A:
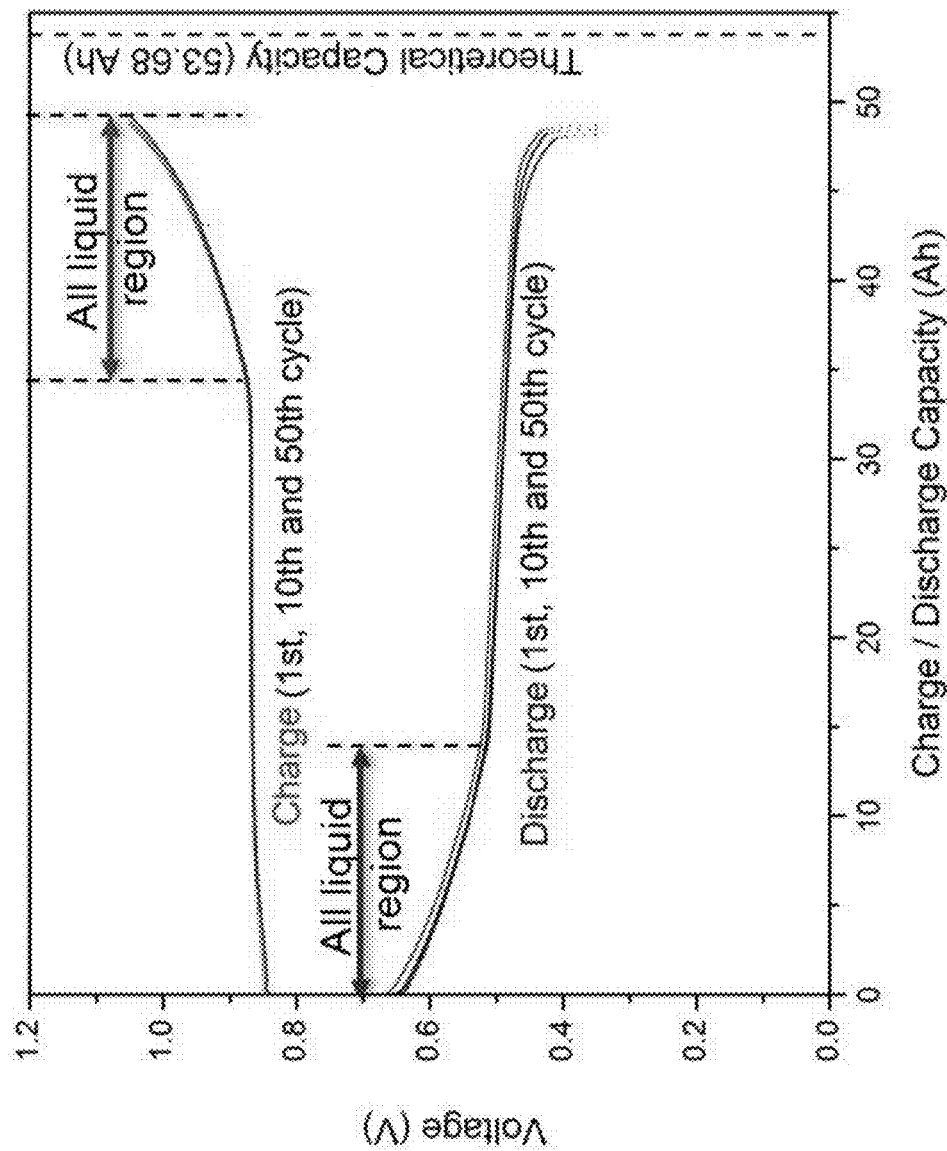
FIG. 5A shows voltage profiles for charge and discharge cycles as a function of the cell capacity of an exemplary Li—Bi battery system according to embodiments of the present invention.
Figure 5B:
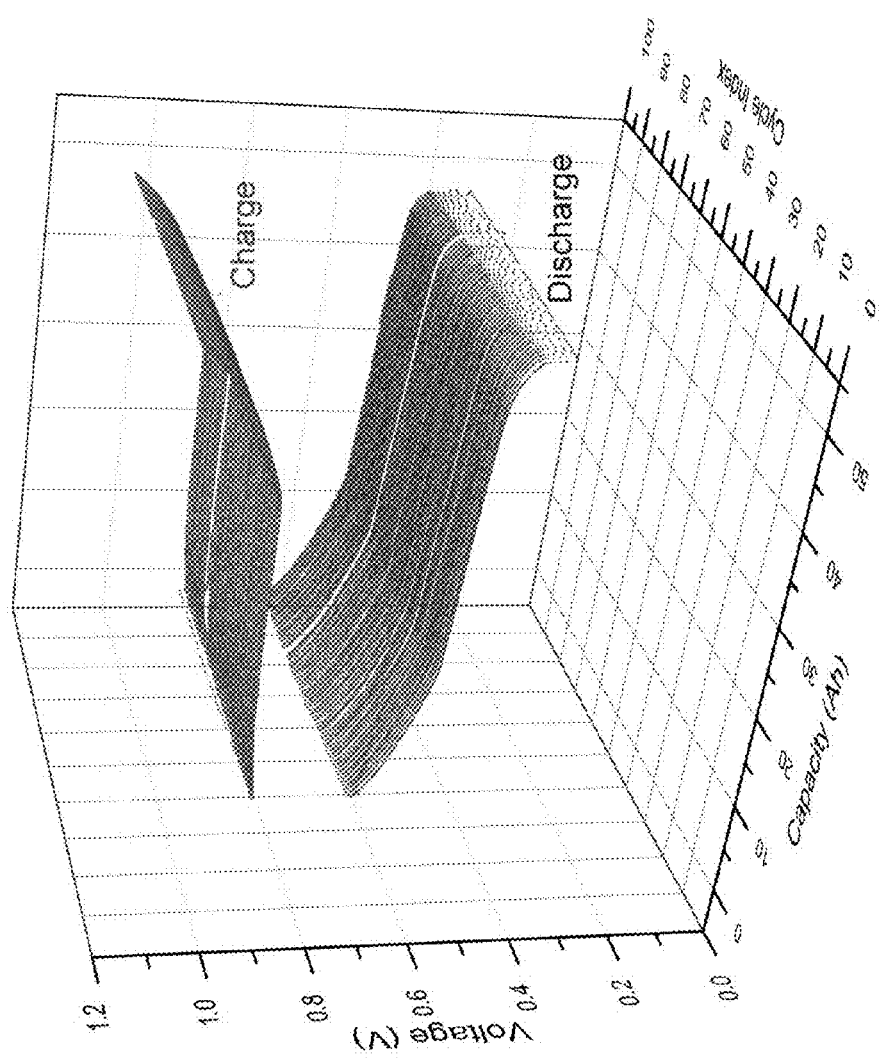
FIG. 5B shows voltage profiles for charge and discharge cycles as a function of capacity and cycle index of an exemplary Li—Bi battery system according to embodiments of the present invention.

The charge/discharge voltage profiles are shown as a function of the cell capacity in FIGS. 5A and 5B. In FIG. 5A, the voltage profiles from the 1st, 10th and 50th cycles are shown for the charge and discharge cycles. As shown, the profiles almost superimpose signifying that the cycling remains consistent. The sloped region, which can be distinctly observed at the beginning of the discharge cycles and at the end of the charge cycles, composes almost a third of the charge/discharge profiles. The sloped region corresponds to the single liquid phase region in FIG. 4, and is in good agreement with the existence of a single phase region in this system. In FIG. 5B, the profiles are shown as a function of capacity and cycle index (80 continuous cycles), further demonstrating the cycling consistency of the cells.

Figure 6A:
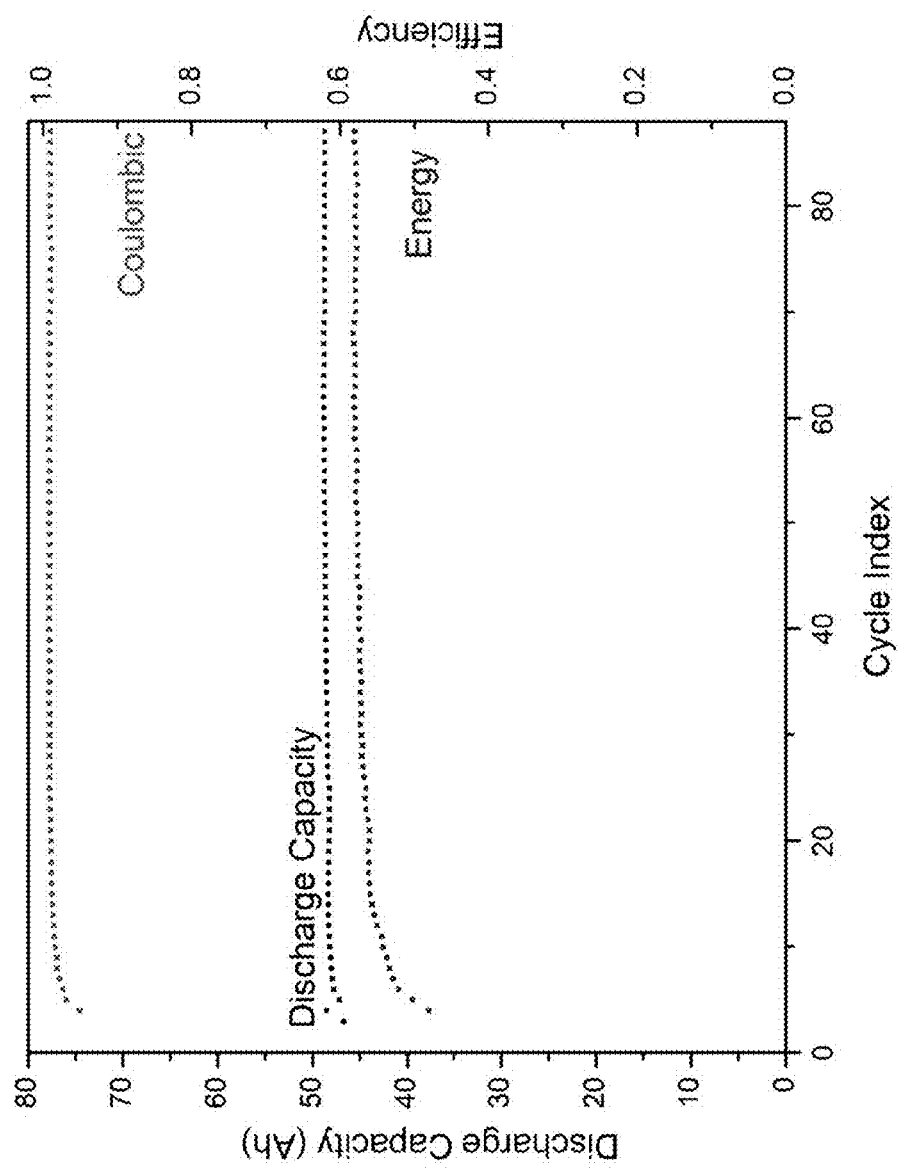
FIG. 6A shows the coulombic and energy efficiency as a function of cycle index of an exemplary Li—Bi battery system according to embodiments of the present invention.

The theoretical capacity of the cell was 53.68 Ah and according to the cell performance, this equates to a lithium utilization of over 92%. The coulombic efficiency of the cell was around 99% throughout the operational lifetime of the cell as can be seen in FIG. 6A. As with all other 50 Ah Li—Bi cells, it was observed that the leakage current rapidly decreases over the initial cell cycling which leads to an increase in the discharge capacity, a decrease in the charge capacity and a corresponding increase in the coulombic efficiency. In the cell shown in FIG. 6A, the leakage current decreased from 16 mA/cm2 (before cycling) to 3 mA/cm2 (10 cycles) to 1.6 mA/cm2 (after 100 cycles).

Figure 6B:
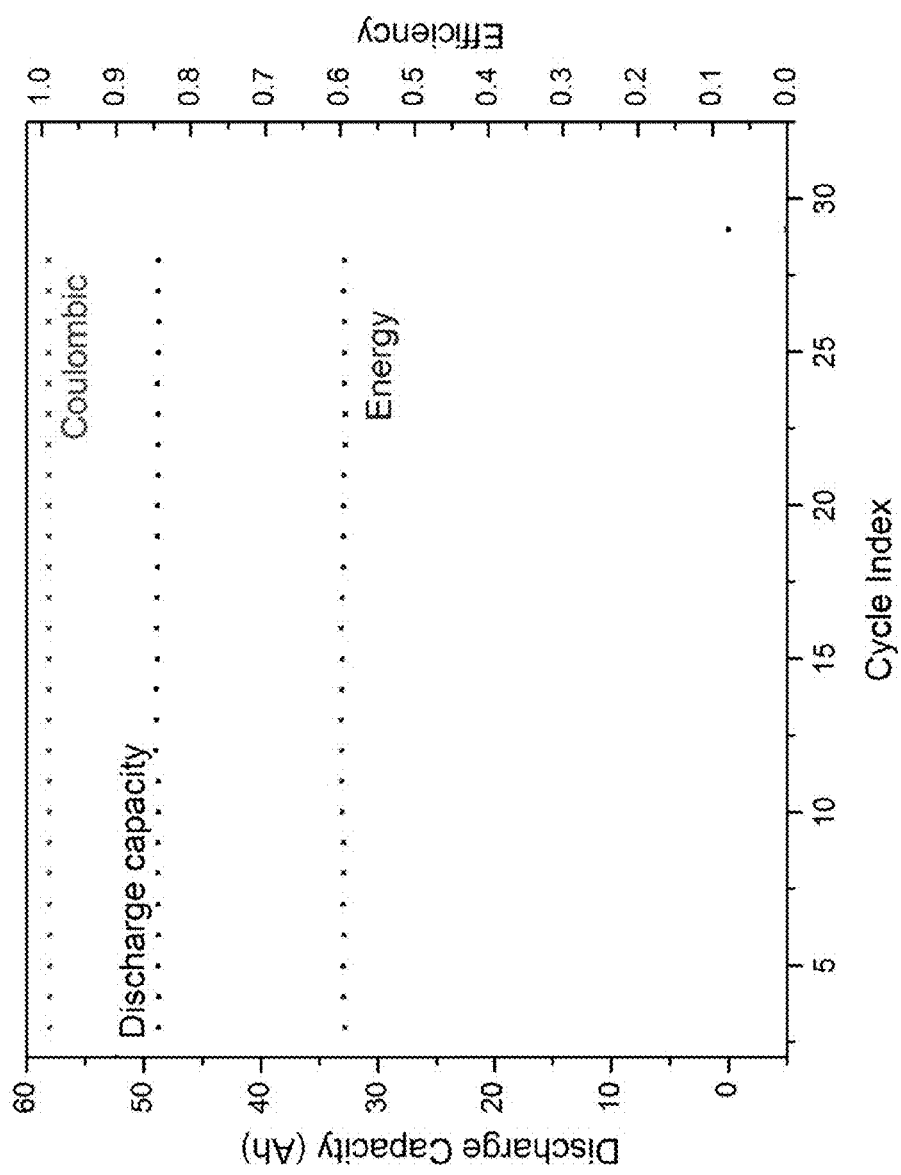
FIG. 6B shows the resumption of cycling after a room temperature cool-down of an exemplary Li—Bi battery system according to embodiments of the present invention.

Under actual field operation conditions of a self-heated cell stack, the temperature is likely to fluctuate depending on the rate of charge or discharge at that instant. In order to demonstrate the cell robustness under temperature changes, the cell was allowed to cool down to room temperature during cell cycling. After the cool-down, the cell was reheated to the operating temperature and cycling was resumed. The results from the post cool-down cycling are shown in FIG. 6B. As shown, the coulombic efficiency (99%) and energy efficiency (60%) are exactly the same as pre cool-down. The discharge capacity was also unaffected.

Figure 7A:
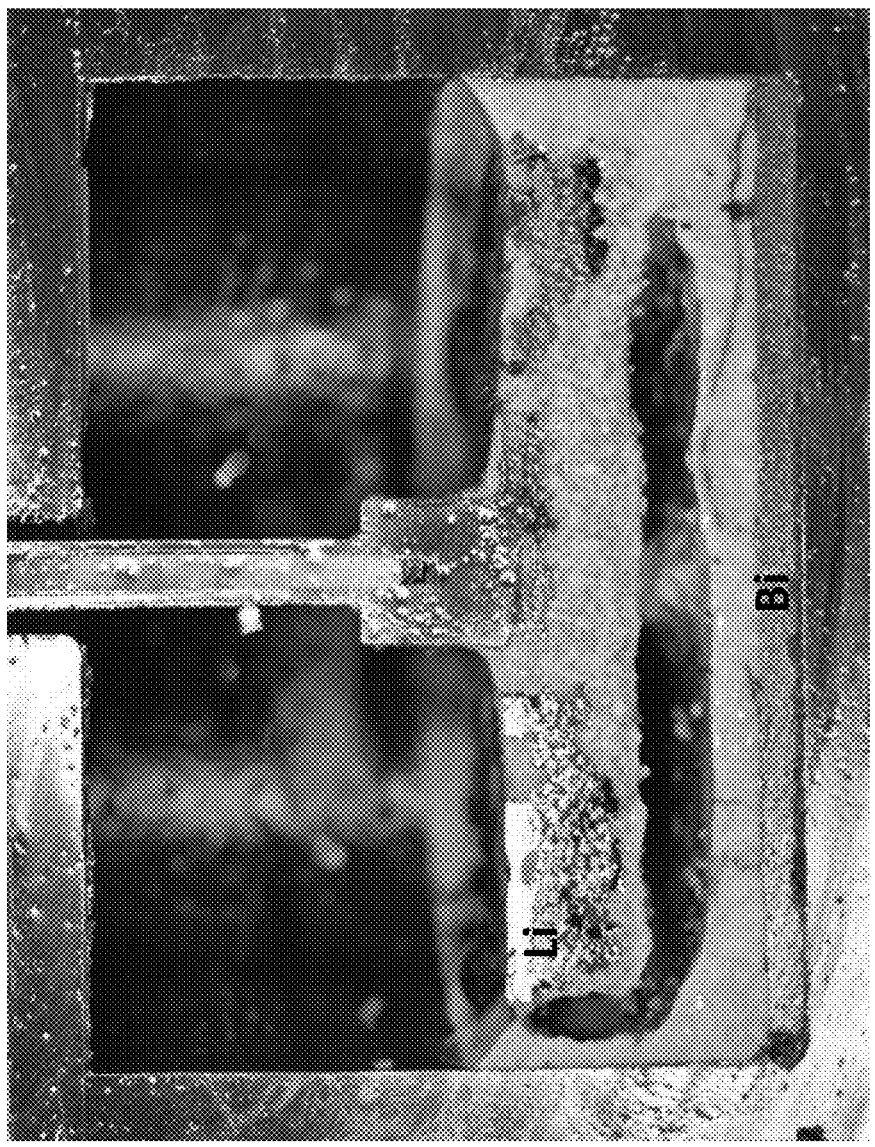
FIG. 7A is a photograph of a cross-sectional view of an exemplary Li—Bi battery system in the fully charged state according to embodiments of the present invention.
Figure 7B:
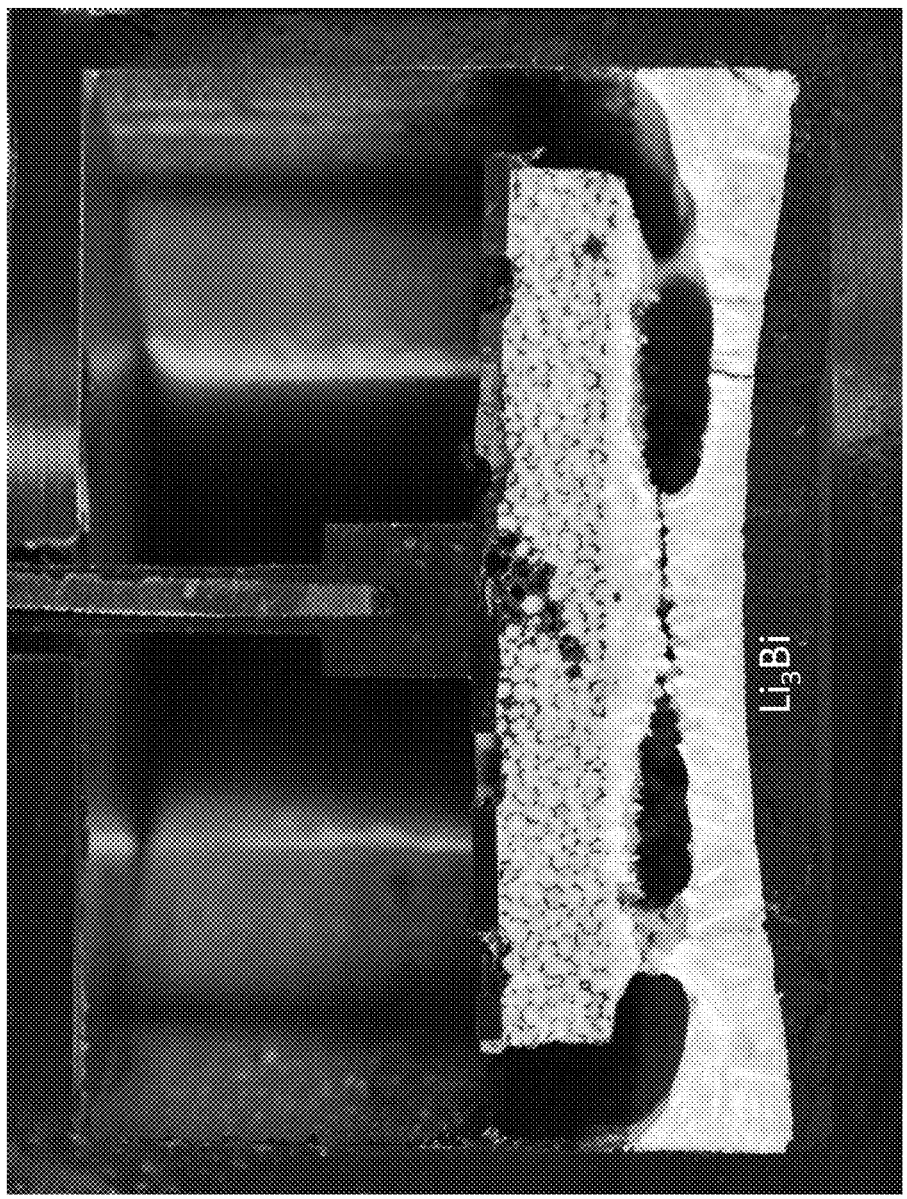
FIG. 7B is a photograph of a cross-sectional view of an exemplary Li—Bi battery system in the fully discharged state according to embodiments of the present invention.

FIGS. 7A and 7B are photographs of a cross-sectional view of an exemplary Li—Bi battery system of the present invention after cycling in both the fully charged and fully discharged state. FIG. 7A shows that the positive electrode (Bi) was fully liquid in the charged state, and there are no second phases present. This proves that the positive electrode can remove any mechanical defects (e.g., dendrites, cracks) that may be present in the solid phase and "heal" itself after every charge, by eliminating any solid phase formed during the previous discharge. In the discharged state, the intermetallic (which was solid at operating temperature) forms above a small remaining pool of liquid Bi at the positive electrode (see, e.g., FIG. 7B).

Example 2

Figure 8:
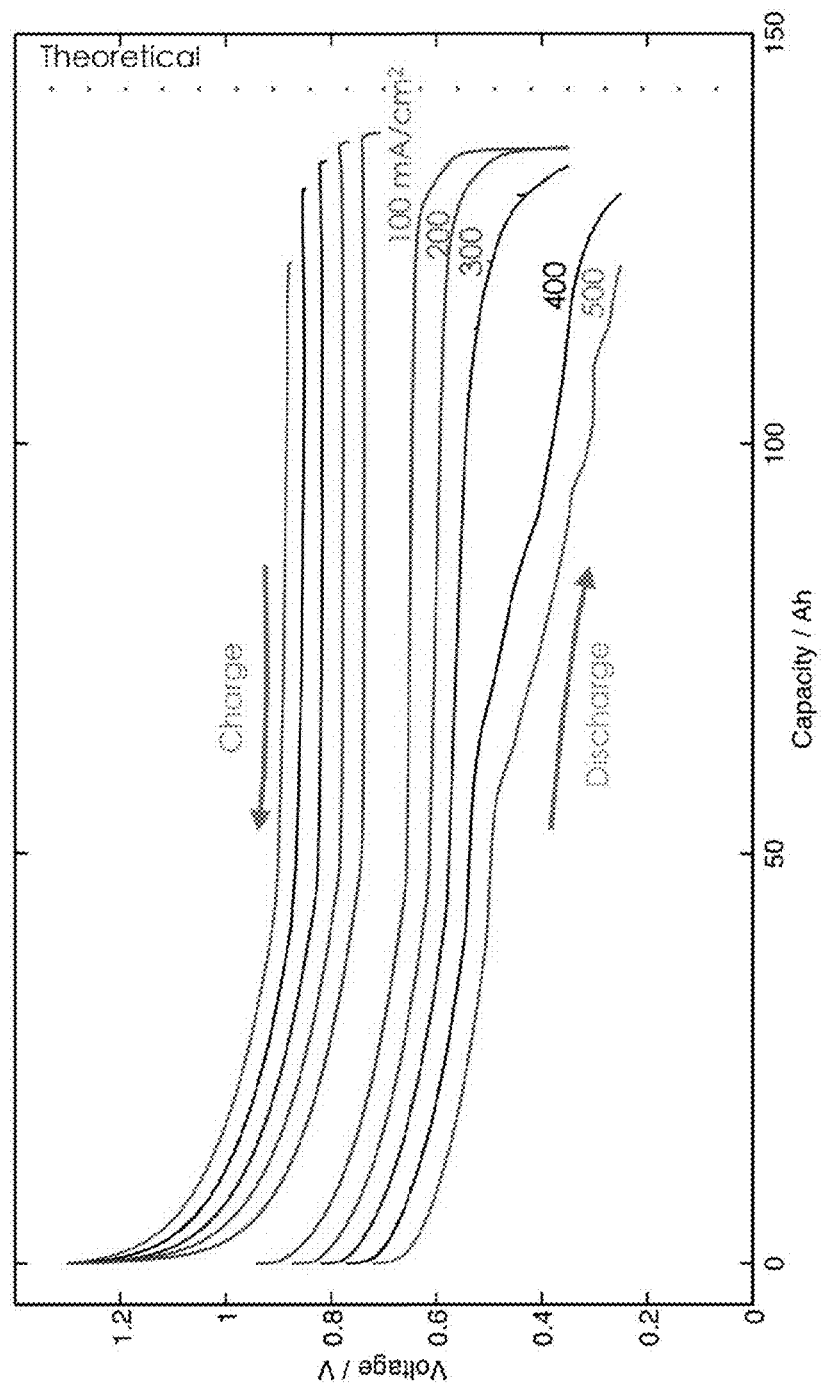
FIG. 8 shows the voltage profile of a large-scale Li—Bi cell at various current rates in accordance with embodiments of the present invention.

A large-scale cell (e.g., 182 $cm^2$, 6 inch inside diameter) was demonstrated using a liquid/solid positive electrode in the battery system in accordance with embodiments of the present invention. The cell was designed with a $Li_{70\%}$—Bi composition in the fully discharged state. The electrolyte used was a $LiF_{30\%}$—$LiCl_{70\%}$ eutectic composition ($T_m$=500° C.). The operating temperature was 540° C. The cell was assembled and operated for more than 3000 hrs. This battery system demonstrated excellent performance with charge/discharge energy efficiencies ranging from 48-91.7% when cycled in the range of 50-500 $mA/cm^2$, see, e.g., FIG. 8.

Figures 9A, 9B:
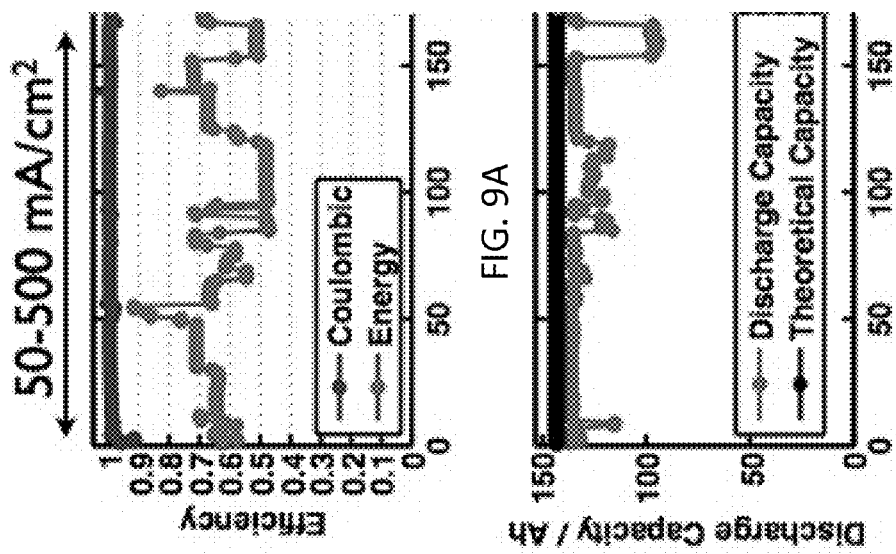
FIGS. 9A and 9B show the coulombic efficiency and energy efficiency and the discharge capacity, respectively, as a function of cycle index at various current rates of an exemplary Li—Bi battery system according to embodiments of the present invention.

FIGS. 9A and 9B show performance metrics (e.g., the efficiencies and the discharge capacity, respectively), as a function of cycle index of the exemplary Li—Bi battery system. A wide range of test parameters were used (e.g., current, voltage cutoffs, etc.) notably various current rates (50-500 $mA/cm^2$).

Figure 10A:
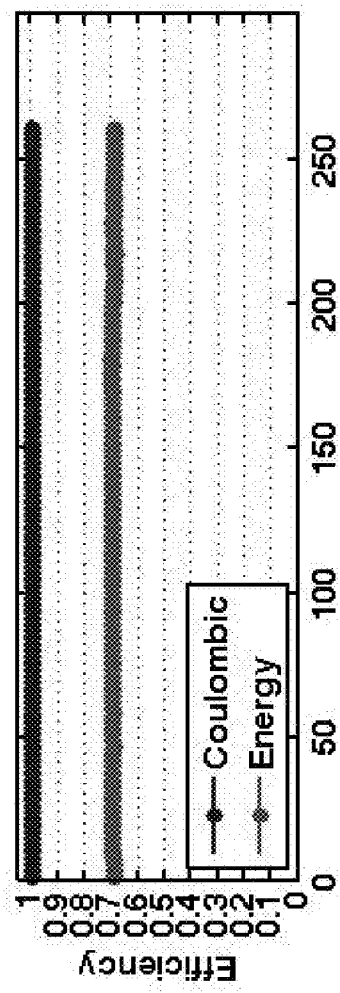
FIGS. 10A and 10B show the coulombic efficiency and energy efficiency and the discharge capacity, respectively, as a function of cycle index at the same current rate of an exemplary Li—Bi battery system according to embodiments of the present invention.
Figure 10B:
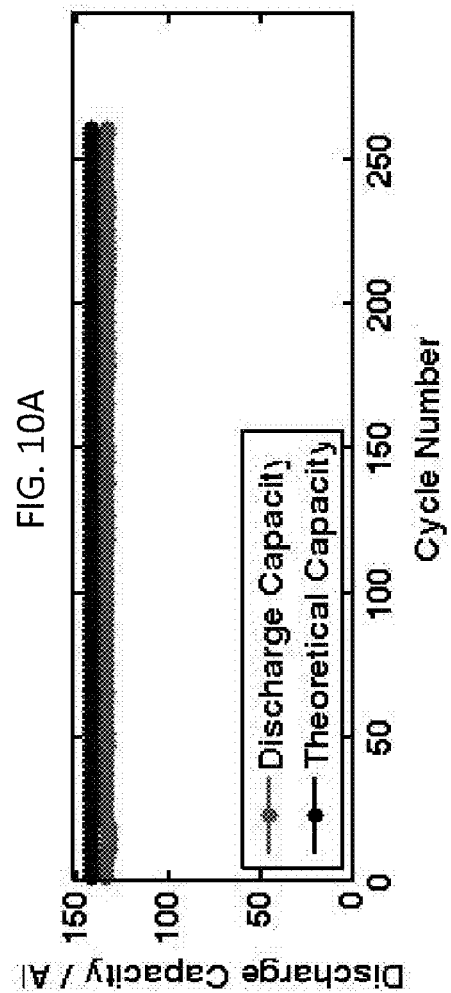

FIGS. 10A and 10B show the coulombic efficiency and energy efficiency and the discharge capacity, respectively, as a function of cycle index at the same current rate of 300 $mA/cm^2$. After 250 cycles, the performance of the exemplary Li—Bi battery system is stable and the capacity fade observed is negligible.

Traditional solid state batteries suffer from high capacity fade as the solid electrodes degrade with cycling. Traditional liquid metal batteries promise long cycle life by remaining liquid during all stages of operation, but this limits the discharge composition to the fully liquid regions of the electrode systems. By utilizing both liquid and solid phases for the positive electrode (and possibly also the negative electrode), large cost savings can be obtained by allowing more negative electrode material to be discharged into the same amount of positive electrode while retaining the benefits of the healing property of operating the positive electrode in the liquid phase.

Embodiments of the present invention have vast applications in various industries, for example, the commercial application of large scale batteries for grid storage, the potential applications in transport industries, etc. Embodiments represent another step towards achieving a low cost storage device for stationary applications and the first step toward a low cost battery for transport applications.

The embodiments of the invention described above are intended to be merely exemplary; numerous variations and modifications will be apparent to those skilled in the art. All such variations and modifications are intended to be within the scope of the present invention as defined in any appended claims, which form a part of the written description of this application.

What is claimed is:

1. An electrochemical cell system configured to exchange energy with an external device, the electrochemical cell system comprising:
   a positive electrode comprising a first metal or alloy;
   a negative electrode comprising a second metal or alloy; and
   an electrolyte comprising a salt of the second metal or alloy, the electrolyte contacting the negative electrode and the positive electrode at respective electrode/electrolyte interfaces, wherein the positive electrode, the negative electrode, and the electrolyte are in a liquid phase at an operating temperature of the electrochemical cell system during at least one portion of operation, and the operating temperature is between about 300° C. to about 800° C., wherein the positive electrode is entirely in a liquid phase in one charged state and includes a solid phase of 50 vol % or greater in a discharged state at the operating temperature of the cell system, and wherein the solid phase of the positive electrode comprises a solid intermetallic formed by the first and the second metals or alloys.

2. The electrochemical cell system of claim 1, wherein the first metal or alloy comprises bismuth.

3. The electrochemical cell system of claim 1, wherein the second metal or alloy comprises lithium.

4. The electrochemical cell system of claim 1, wherein the first metal or alloy comprises bismuth, the second metal or alloy comprises lithium, and the solid intermetallic is $Li_3Bi$.

5. The electrochemical cell system of claim 4, wherein the positive electrode includes an alloy comprising up to 75% mol of lithium in bismuth.

6. The electrochemical cell system of claim 1, wherein an open circuit voltage is at least about 0.5 V.

7. The electrochemical cell system of claim 1, wherein the second metal or alloy comprises an alkali metal.

8. The electrochemical cell system of claim 1, wherein the negative electrode is entirely in the liquid phase in one charged state and includes a solid phase in another charged state, wherein the solid phase of the negative electrode comprises a solid intermetallic formed by the first and the second metals or alloys.

9. A method of storing electrical energy from an external circuit, the method comprising:
providing an electrochemical cell system comprising:
a positive electrode comprising a first metal or alloy;
a negative electrode comprising a second metal or alloy; and
an electrolyte comprising a salt of the second metal or alloy, the electrolyte contacting the negative electrode and the positive electrode at respective electrode/electrolyte interfaces,
wherein the positive electrode, the negative electrode, and the electrolyte are in a liquid phase at an operating temperature of the electrochemical cell system during at least one portion of operation, and the operating temperature is between about 300° C. to about 800° C.,
wherein the positive electrode is entirely in a liquid phase in one charged state and includes a solid phase of 50 vol % or greater in a discharged state at the operating temperature of the cell system, and
wherein the solid phase of the positive electrode comprises a solid intermetallic formed by the first and the second metals or alloys;
electronically connecting the electrochemical cell system to the external circuit; and
operating the external circuit so as to drive transfer of the second metal or alloy from the positive electrode to the negative electrode.

10. The method of claim 9, wherein the first metal or alloy comprises bismuth.

11. The method of claim 9, wherein the second metal or alloy comprises lithium.

12. The method of claim 9, wherein the first metal or alloy comprises bismuth, the second metal or alloy comprises lithium, and the solid intermetallic is $Li_3Bi$.

13. The method of claim 12, wherein the positive electrode includes an alloy comprising up to 75% mol of lithium in bismuth.

14. The method of claim 9, wherein an open circuit voltage is at least about 0.5V.

15. The method of claim 9, wherein the second metal or alloy comprises an alkali metal.

16. The method of claim 9, wherein the negative electrode is entirely in a liquid phase in one charged state and includes a solid phase in another charged state, wherein the solid phase of the negative electrode comprises a solid intermetallic formed by the first and the second metals or alloys.

17. The electrochemical cell system of claim 1, wherein the operating temperature is between about 350° C. to about 600° C.

18. The electrochemical cell system of claim 1, wherein the solid phase is 75 vol % or greater in the discharged state.

19. The method of claim 9, wherein the operating temperature is between about 350° C. to about 600° C.

20. The method of claim 9, wherein the solid phase is 75 vol % or greater in the discharged state.

* * * * *